United States Patent [19]

Rest

[11] 4,158,407
[45] Jun. 19, 1979

[54] JOURNAL GUARD

[76] Inventor: Frederick G. Rest, 175 E. Delaware, Apt. 8011, Chicago, Ill. 60611

[21] Appl. No.: 842,473

[22] Filed: Oct. 17, 1977

[51] Int. Cl.² .............................................. B65D 85/68
[52] U.S. Cl. ................................. 206/318; 138/96 R; 150/52 R; 295/36 R
[58] Field of Search ........................... 138/96 R, 96 T; 301/108 R, 37 CM, 37 CD; 295/36 R; 150/52 R, 52 K; 220/319, 320; 206/318, 446

[56] References Cited

U.S. PATENT DOCUMENTS

| | | | |
|---|---|---|---|
| 2,141,381 | 12/1938 | Engstrom | 138/96 T |
| 3,574,312 | 4/1971 | Miller | 138/96 R |

Primary Examiner—Houston S. Bell, Jr.
Attorney, Agent, or Firm—Richard G. Lione; Joan I. Norek

[57] ABSTRACT

A novel journal guard for the journal portion of a wheel axle for use during transport, handling, and storage is provided which includes a resilient tubular housing member with an annular mouth and a resilient house base opposite the mouth. The base member has a thickness which decreases towards its center to accomodate thermal expansion of air trapped within the guard. The guard also includes means for securing the tubular housing about its annular mouth to an axle section mediate between the journal and wheel seat. The housing is preferably secured to this mediate section by means of a radial compression device disposed between two shoulders which extend about the outer perimeter of the housing mouth. The guard protects the journal section of the axle and any other structures outboard of the journal during transport, handling, and storage. The guard is easily secured to or removed from the axle and is reusable.

14 Claims, 5 Drawing Figures

U.S. Patent   Jun. 19, 1979   4,158,407
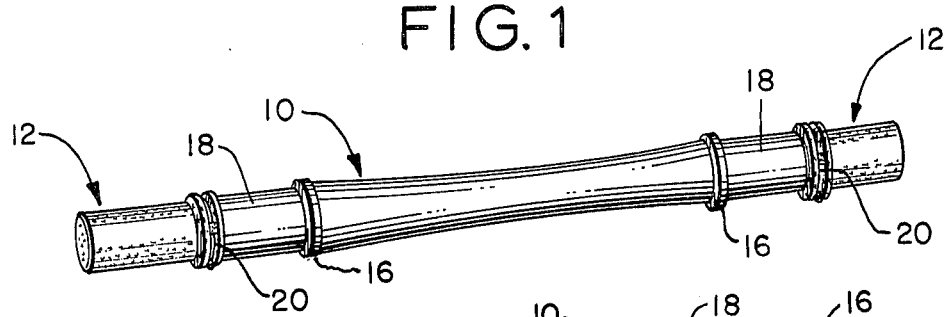
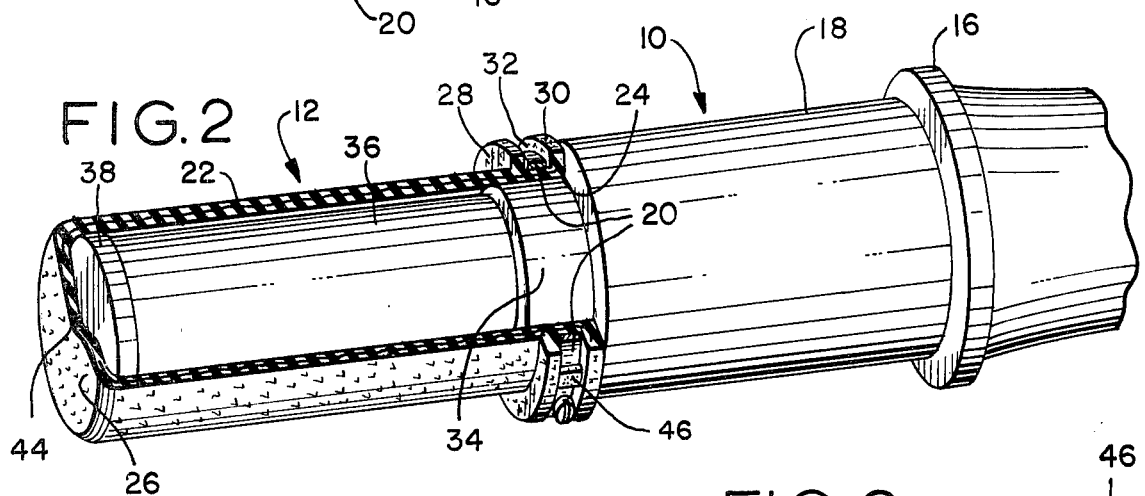
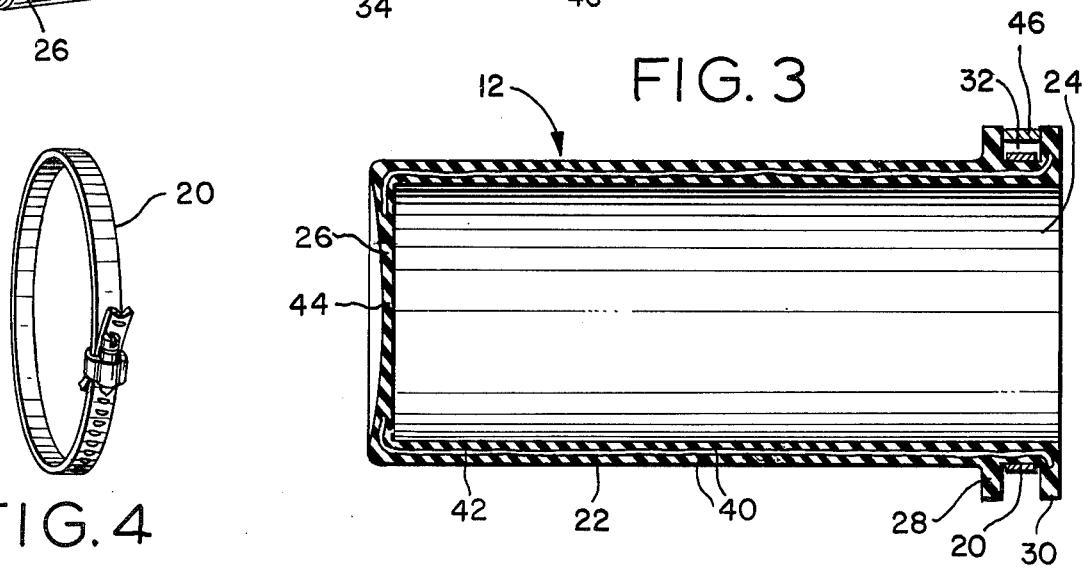
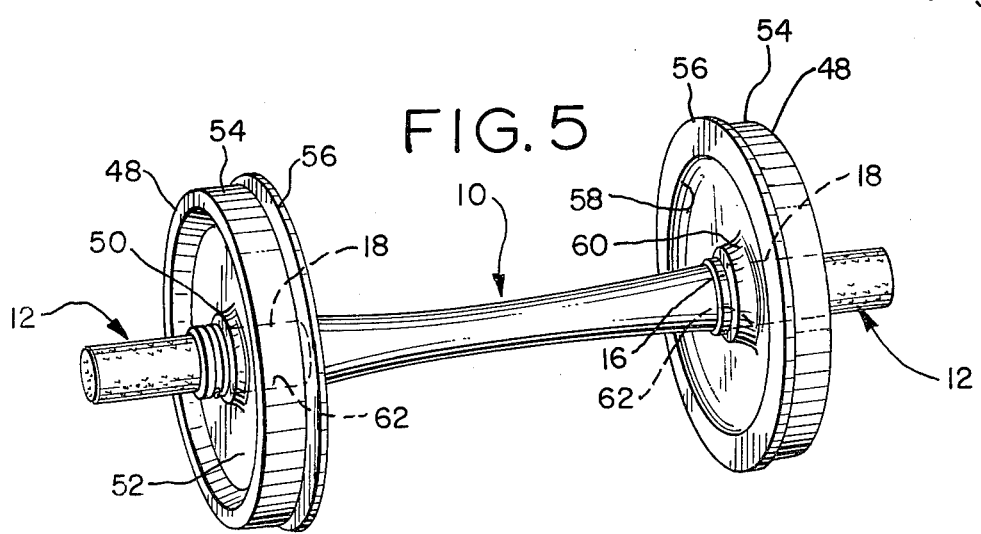

JOURNAL GUARD

BACKGROUND OF THE INVENTION

This invention relates to a novel journal guard or casing for the end portion of a wheel axle which protects at least the journal portion of the axle from damage due to adverse environmental conditions, accumulation of foreign particles, and mechanical abuse or impacts during transportion, storage and/or handling.

An axle is a pin or shaft on which two wheels are mounted on the section of the axle generally referred to as a wheel seat. In railway cars, locomotives, and other heavy vehicles, the axles run in bearings and the sections making contact therein are generally referred to as journals. Railway axles have journal sections outboard of the wheel seat, i.e. the wheel seats are positioned closer to the center of the axle than are the journals. A typical axle includes of course two wheel seats and two journal sections.

Railway axles and the like are often transported large distances with their journal sections unprotected from adverse weather conditions, abrasive particles and mechanical damage and jarrings because their large bulk and configuration makes protective packaging prior to transport extremely difficult and prohibitively expensive. A variety of guards for protecting axles after installation are known, such as those disclosed in U.S. Pat. Nos. 3,713,709, 2,995,389 and 1,565,003 and British Pat. No. 23,467. Such guards however merely provide protection during operation. Moreover, all of these guards are designed to be substantially permanently installed by complicated mounting procedures and merely cover gaps between members to avoid abrasion or other damage caused by foreign matter being lodged between the members. None of these guides are suitable for use prior to installation, i.e., for simple mounting or removal on the end of an axle to protect its journal section, not only against the accumulation of foreign matter but also against mechanical damage or adverse weather conditions during transportation, handling and/or storage.

Wheel axles are most frequently shipped or stored as an assembly with two wheels mounted, one on each wheel seat but may of course be shipped without the wheels. The conventional method of protecting the journal portion is merely by applying a layer of grease thereto, which provides substantially no protection from mechanical damage. When stored or transported, axle and wheel assemblies are generally aligned on a double track system so as to dispose a number of assemblies in a nested relationship and mechanical stops or bumpers may be used to avoid contact between the journals and the wheels of other assemblies. If such stops or bumpers are not used properly or omitted altogether, as has occurred more frequently than desired in the past, the incidence of mechanical damage to journals is high. A suitable guard would facilitate handling of the axles by reducing the amount of caution necessary to protect the journal.

Another method of protecting journals can be envisioned, wrapping in several layers of protective material, but this method has not been utilized generally because the expense of materials that are discarded after use are employed is prohibitive and wrapping each journal securely by hand is unduly time consuming. A suitable guard which is easy to secure to the axle and which is reusable again and again avoids the prohibitive cost and expenditure of time generally believed necessary to provide adequate protection to journals.

In transport, moreover, a railway axle or the like may be subject to a wide variety of weather conditions ranging from extremely cold to extremely warm temperatures. A suitable guard must effectively accomodate thermal expansion of air trapped within the guard caused by a rise in environmental temperature and should also protect the housed members from high impact damage.

It is desirable to provide a protective guard for the journal portions of railway axles and the like during transportation and storage that may be easily mounted and removed from the axles and yet provide protection from accumulation of foreign particles, damage from adverse weather conditions, and mechanical damage. It is also desirable to provide a guard that is sufficiently sealed to the axle that is is substantially impermeable to fluid flow and yet accomodates thermal expansion of air trapped within the guard. It is also desirable to provide a resilient covering for journals of railway axles or the like which decreases the caution necessary for handling of the axles before and after transportation.

It is therefore an object of the present invention to provide a guard for the journal of a railway axle or the like which is simple to mount or remove from an axle and yet is reusable. It is another object to provide a guard for journals which will protect the journal section and sections outboard of the journal from not only accumulation of foreign matter, such as abrasive particles, and adverse weather conditions but also mechanical damage caused by impact or jarring. It is also an object to provide a guard for a journal which accomodates expansion of the air trapped within and reduces the caution necessary for handling the axles.

SUMMARY OF THE INVENTION

The foregoing and other objects are realized in accord with the invention by providing a journal guard which includes a resilient tubular housing member including a substantially annular mouth, a resilient housing base opposite the mouth and a means for securing the housing about its annular mouth to a section of the axle. Railway axles generally have an enlarged section (larger cross-sectional diameter than the journal) positioned mediate between the wheel seat and the journal and the mouth of the tubular housing is secured to this mediate section preferably by radial compression devices.

The housing base is formed with a radially increasing thickness and its perimeter thickness corresponds generally to the thickness of the tubular housing member. The centermost portion of the base therefore is of a substantially reduced thickness, allowing for expansion or contraction to accomodate thermal expansion or contraction of air trapped within the guard.

The housing is formed of a resilient material preferably including a center layer of flexible cord or fibrous material and is of such thickness that it protects the encased portion of the axle from high impact damage.

A preferred radial compression device for the mouth of the housing is a worm gear hose clamp, preferably disposed between two shoulders that extend about the outer periphery of the mouth portion of the housing member. The shoulders may also include bridging members or loops that extend between the shoulders and overlie the hose clamp to further secure the hose clamp from dislodgement and prevent impact damage to the clamp.

The journal guard may be used not only with railway wheel and axle assemblies during transportion and/or storage but also for axles without the wheels mounted.

A given axle or assembly of axle plus wheels would of course preferably be equipped with two journal guards, one at each end. The journal guard is slipped over the end of the axle so that the mouth section of the housing overlies enlarged portion inward of the journal and is secured thereto, so that the journal and other portions of the axle outward of the journal are completely encased and protected by the guard. When desired, the guard can easily be removed from the end of an axle by loosening the securing means and slipping the guard off. The guard is then in condition for reuse for another axle.

The invention is hereafter described with reference to the journal guard 12 in combination with an axle for railway cars. The journal guard 12 however can be used with any suitable axle which has its journal outboard or outward of an axle section that has a larger cross-sectional diameter than the journal. Moreover, the journal guard may also be used with a suitable axle that has its wheel seat outboard of the journal as long as the journal portion to be protected is outward of another section of larger cross-sectional diameter to which the journal guard is secured.

DESCRIPTION OF THE DRAWINGS

FIG. 1 is a perspective view of a railway axle with journal guards embodying features of the present invention;

FIG. 2 is an enlarged, partially cut-away perspective view of the axle and a journal guard of FIG. 1;

FIG. 3 is a cross-sectional side view of a journal guard of FIG. 1;

FIG. 4 is an enlarged perspective view of the securing means of a journal guard of FIG. 1; and FIG. 5 is a perspective view of a wheel and wheel axle assembly with journal guards embodying features of the present invention.

DETAILED DESCRIPTION OF THE INVENTION

Referring now to the drawings, and particularly to FIG. 1, there is illustrated a railway axle, designated generally 10, which has a journal guard embodying features of the present invention, indicated generally by the reference numeral 12, on each its ends. The railway axle 10 includes a center body section 14 flanked by two wheel seat collars 16 and two wheel seats 18. All other portions of the axle 10 are encased in the journal guards 12 which are secured so as to be substantially impermeable to fluid flow and to protect the encased journals of the axle 10 from damage due to accumulation of foreign particles and adverse weather conditions, and also from mechanical damage.

Each guard 12 is shown secured to the axle 10 by a worm gear hose clamp 20 and may be easily removed from the axle 10 by loosening the clamp 20 and sliding if off the end of the axle 10. The guard 12, when removed, is in suitable condition for reuse on another railway axle. The worm gear hose clamp 20 is a preferred radial compression device for securing a guard and other means for securing the guard could be employed.

Referring now to FIG. 2 also, the guard 12 includes a tubular housing member 22 with an open end or mouth portion 24. Opposite the mouth 24 is a housing base member 26 which encloses the outermost end of the axle 10. About the mouth portion 24 of the tubular housing member 22 extends a first and second shoulder 28, 30 which together form a channel 32. Disposed within the channel 32 is the hose clamp 20 which secures the journal guard 12 to the axle. Underlying the guard 12 is an enlarged mediate section or dust guard seat 34 to which the guard 12 is secured by means of the hose clamp 20. Outward of the mediate section 34 is the journal 36 and the end collar 38 of the axle 10. The journal 36 and end collar 38 are of course completely encased in the guard 12. The tubular housing member 22 has a substantially consistent internal cross-sectional diameter which corresponds to the cross-sectional diameter of the mediate section 34. The end collar 38 is substantially of the same cross-sectional diameter as the mediate section 34 and therefore fits snugly within the journal guard 12.

Referring now particularly to FIG. 3, the tubular housing member 22 has a substantially uniform thickness which is sufficient to withstand impacts and thereby protect the underlying portions of the axle 10. The tubular housing member 22 preferably has a thickness of about ¼ to about ½ inch and most preferably a thickness of about ⅜ inch. The tubular housing member 22 is formed of two plies of durable but resilient rubber 40 and an intermediate layer of flexible fibrous or cord material 42 such as a tire cord material. The plies of rubber 40 are preferably both oil and water resilient and impermeable to ozone and not affected by temperature extremes. The cord material 42 resists cutting, pinching, tearing, abrasion and piercing of the guard 12.

The housing base member 26 is constructed of the same material as the tubular housing member 22 except that the intermediate layer 42 perferably does not extend to the center 44 and the plies as rubber 40 decreases in thickness towards the center portion 44 of the base member 26. That is, the base member 26 has a radial increasing thickness so as to have a thickness approximately equal to the tubular housing member 22 along its perimeter and to have a substantially lesser thickness about its center 44. The decrease in thickness of the base member 26 must be sufficient to allow expansion to accomodate thermal expansion of air trapped within the guard 12 when in use. The base member 26 preferably tapers towards its center 44 to a thickness of about 1/16 to about 3/16 inch. The most preferred thickness of the center 44 of the base 26 is about ⅛ inch. These construction materials and thicknesses are preferred but other materials and thicknesses can be envisioned which would allow protection from mechanical damage and that caused by adverse weather conditions, and yet be sufficiently resilient to be secured tightly to the axle 10.

Referring now to FIG. 4 also, the preferred securing means includes a hose clamp 20 disposed within a channel 32 formed by the first and second shoulders 28, 30 and two bridging members or loops 46 which extend between the shoulders 28, 30 and overlie the hose clamp 20. The bridging members 36 not only retain the hose clamp 20 during use but also retain the clamp 20 together with the other portions of the journal guard 12 when the clamp 20 is loosened during periods of nonuse. Moreover, having the clamp 20 disposed within the channel 32 below the loops 46 protects the clamp 20 from impact damage or battering. The clamp 20 is a conventional worm gear hose clamp well known to those skilled in the art. The securing means as illustrated is a preferred embodiment of the invention wherein the shoulders 28, 30 and bridging members 46 are not only molded as an integral unit but are also molded together as an integral unit with the tubular housing member 22 and the housing base 26.

In FIG. 5, there is illustrated two journal guards 12, generally as described above, in combination with an assembly which includes the railway axle 10 and railway wheels designated generally 48. The wheels 48, which are seated on the wheel seats 18 inward of the axle guards 12, include a hub portion 50, a center plate or web 52, a rim 54 which includes a flange 56, a back rim fillet 58, a back hub fillet 60 and a center bore 62. Again, although the journal guard 12 is illustrated with respect to an assembly including a railway axle 10 and railway wheels 48, the invention is not limited specifically to railway axles and wheels and can be utilized in conjunction with any suitable wheel and/or axle.

Although other materials could be envisioned for the journal guard 12, the construction described herein with the layer of flexible fibrous or cord material 42 molded together between two plies of rubber 40 is a particularly preferred construction, combining the desired thickness and resiliency demanded by the present invention with the additional toughness provided by the intermediate layer 42.

It will be understood that changes may be made in the details of construction, arrangement and operation without departing from the spirit of the invention, particularly as defined in the following claims.

I claim:

1. A journal guard for the end portion of a wheel axle, which end portion includes a journal, a mediate section, and an end collar, said mediate section and end collar flanking the journal and having a larger diameter than said journal, and said end collar being disposed outboard of said journal, comprising:
   a tubular housing member having an internal diameter substantially equal to that of the end collar and mediate section and including an open end;
   a resilient housing base opposite said open end; and
   means for securing said housing member to said mediate section whereby said end collar, journal, and mediate section are encased within said guard and said guard is disposed spaced apart from the surface of said journal.

2. The journal guard of claim 1 wherein said housing base has a radially increasing thickness and is expandable to accommodate expansion of air within said guard.

3. The journal guard of claim 2 wherein said securing means includes at least one shoulder extending about the outer perimeter of the housing member and a radial compression device adjacent said shoulder.

4. The axle guard of claim 3 wherein said securing means includes a first and a second shoulder forming a channel and said radial compression device is disposed within said channel.

5. The journal guard of claim 4 further including at least one bridge member extending between said first and second shoulders which bridge member overlies and retains said radial compression device.

6. The journal guard of claim 5 wherein said tubular housing, housing base and shoulders are formed of two plies of resilient material and a layer of flexible fibrous material between said piles, whereby cutting, pinching, tearing, abrasion, and piercing of the journal guard is substantially prevented.

7. The journal guard of claim 6 wherein said tubular housing is of a substantially uniform thickness within the range of about $\frac{1}{4}$ to about $\frac{1}{2}$ inch and said housing base has a center thickness of about 1/16 to about 3/16.

8. The journal guard of claim 7 wherein said tubular housing has a substantially uniform thickness of about $\frac{3}{8}$ inch and said housing base has a center thickness of about $\frac{1}{8}$ inch.

9. A reusable journal guard for use during transportation and storage of a wheel axle which wheel axle has an end collar of larger diameter than the journal to be protected, which end collar is outboard of said journal, and the like, comprising:
   a tubular housing member with a single open end;
   two shoulders forming a channel extending about the outer annular perimeter of said housing in close proximity to said open-end;
   a radial compression device disposed within said channel for securing the guard to a portion of said wheel axle; and
   wherein said journal guard is of a sufficient diameter of slide over said end collar for application and removal of the journal guard on and from the end of said wheel axle.

10. The journal guard of claim 9 wherein the guard is formed of a layer of fibrous material and two layers of molded rubber encasing said fibrous material.

11. The journal guard of claim 10 wherein the guard is formed as a unitary, integral structure.

12. The journal guard of claim 11 wherein the guard is formed with an area of weakness to accomodate thermal expansion of air within.

13. The journal guard of claim 12 further including at least two loops between said shoulder overlying said radial compression device.

14. The journal guard of claim 13 wherein said radial compression device is a worm gear hose clamp.

* * * * *

UNITED STATES PATENT AND TRADEMARK OFFICE
CERTIFICATE OF CORRECTION

PATENT NO. : 4,158,407
DATED : June 19, 1979
INVENTOR(S) : Frederick G. Rest

It is certified that error appears in the above-identified patent and that said Letters Patent are hereby corrected as shown below:

Col. 2, line 18, delete the first "is" and insert --it-- therefor.

Col. 2, line 19, delete "accomodates" and insert --accommodates-- therefor.

Col. 2, line 33, delete "accomo-" and insert --accommo--- therefor.

Col. 2, line 56, delete "accomodate" and insert --accommodate-- therefor.

Col. 4, line 38, delete "perferably" and insert --preferably-- therefor.

Col. 4, line 47, delete "accomodate" and insert --accommodate-- therefor.

Col. 6, line 14, delete "piles" and insert --plies-- therefor.

UNITED STATES PATENT AND TRADEMARK OFFICE
CERTIFICATE OF CORRECTION

PATENT NO. : 4,158,407

DATED : June 19, 1979

INVENTOR(S) : Frederick G. Rest

It is certified that error appears in the above—identified patent and that said Letters Patent is hereby corrected as shown below:

Column 6, line 38, "of" should read -- to --.

Column 6, line 47, "accomodate" should read -- accommodate --.

Signed and Sealed this

Tenth Day of November 1981

[SEAL]

Attest:

*Attesting Officer*

GERALD J. MOSSINGHOFF

*Commissioner of Patents and Trademarks*